(12) United States Patent
Iorga et al.

(10) Patent No.: US 11,184,267 B2
(45) Date of Patent: Nov. 23, 2021

(54) INTELLIGENT IN-BAND TELEMETRY AUTO-CONFIGURATION FOR IP NETWORKS

(71) Applicant: LENOVO Enterprise Solutions (Singapore) PTE. LTD., New Tech Park (SG)

(72) Inventors: Radu M. Iorga, Bucharest (RO); Roberto Jacob Da Silva, Oak Park, CA (US); Corneliu-Ilie Calciu, Bucharest (RO)

(73) Assignee: LENOVO Enterprise Solutions (Singapore) PTE. LTD., New Tech Park (SG)

( * ) Notice: Subject to any disclaimer, the term of this patent is extended or adjusted under 35 U.S.C. 154(b) by 62 days.

(21) Appl. No.: 16/670,258

(22) Filed: Oct. 31, 2019

(65) Prior Publication Data

US 2021/0135967 A1    May 6, 2021

(51) Int. Cl.
| | | |
|---|---|---|
| *H04L 12/26* | (2006.01) | |
| *H04L 12/721* | (2013.01) | |
| *H04L 12/741* | (2013.01) | |
| *H04L 12/901* | (2013.01) | |

(52) U.S. Cl.
CPC .......... *H04L 43/0858* (2013.01); *H04L 43/10* (2013.01); *H04L 45/72* (2013.01); *H04L 45/745* (2013.01)

(58) Field of Classification Search
None
See application file for complete search history.

(56) References Cited

U.S. PATENT DOCUMENTS

| | | | |
|---|---|---|---|
| 10,750,523 B1* | 8/2020 | Hodroj | H04W 72/044 |
| 2017/0201810 A1* | 7/2017 | Anderson | H04Q 9/00 |
| 2019/0104048 A1* | 4/2019 | Nainar | G06F 11/302 |
| 2019/0260657 A1* | 8/2019 | Filsfils | H04L 43/0829 |
| 2020/0120029 A1* | 4/2020 | Sankaran | H04L 45/48 |

(Continued)

OTHER PUBLICATIONS

Marvell, "Network Telemetry Solutions for Data Center and Enterprise Networks", Mar. 2018, pp. 1-14.

(Continued)

*Primary Examiner* — Duc T Duong
(74) *Attorney, Agent, or Firm* — Kunzler Bean & Adamson; Bruce R. Needham (57) ABSTRACT

An apparatus for in-band telemetry includes a node type identifier circuit that, in response to receiving an ingress/egress ID command, determines that the network node is an ingress node in response to the network node having a direct connection to a source and determines that the network node is an egress node in response to the network node having a direct connection to a destination. The apparatus includes a telemetry packet circuit that creates a telemetry packet in response to the node type identifier circuit determining that the network node is an ingress node. The apparatus includes a telemetry transmission circuit that transmits the telemetry packet in response to the telemetry packet circuit creating the telemetry packet and a packet re-router circuit that, in response to the node type identifier circuit determining that the network node is an egress node, routes a received telemetry packet to a network controller.

20 Claims, 7 Drawing Sheets

(56) References Cited

U.S. PATENT DOCUMENTS

| | | | | |
|---|---|---|---|---|
| 2020/0136973 A1* | 4/2020 | Rahman | ................ | H04L 47/26 |
| 2020/0186465 A1* | 6/2020 | Dontula Venkata | ........................ | H04L 41/0896 |
| 2020/0220793 A1* | 7/2020 | Hira | ..................... | H04L 43/065 |
| 2020/0314107 A1* | 10/2020 | Joshi | ..................... | H04L 63/20 |

OTHER PUBLICATIONS

Broadcom, "BroadView Instrumentation Agent", Specification Software Release 3.3, BroadVeiw-SP102, Nov. 15, 2018, pp. 1-160.
Netronome, "Barefoot Networks and Netronome Demonstrate End-to-End In-Band Network Telemetry for 5G NFV Deployments", Feb. 27, 2017, pp. 1-6.

* cited by examiner

INTELLIGENT IN-BAND TELEMETRY AUTO-CONFIGURATION FOR IP NETWORKS

FIELD

The subject matter disclosed herein relates to in-band telemetry and more particularly relates to auto-configuration of an ingress node and an egress node for in-band telemetry.

BACKGROUND

Whenever a new data flow between a source and a destination in a data network needs to be monitored for latency, the administrator has to provide topology information because the nature of in-band telemetry. The network nodes perform specific tasks based on their location on the path the flow takes: ingress node, transit node and egress node. This means that the ingress and egress node have to be known by the administrator during setup of in-band telemetry. Current solutions for setting up of in-band telemetry require a lot of work by a network administrator to determine which network node is the ingress node connected directly to the source and to determine which network node is the egress node connected directly to the destination. In order to determine the specific input information needed, the network administrator must perform several operations, which may be complex and require the use of multiple tools/applications (e.g. determine in which physical server a virtual-machine is running, determine the switch interfaces where a physical server is attached to, explicitly configure network switches as ingress or egress nodes, etc.).

BRIEF SUMMARY

An apparatus for in-band telemetry includes a node type identifier circuit in a network node that, in response to receiving an ingress/egress ID command, is configured to determine that the network node is an ingress node in response to the network node having a direct connection to a source identified by the ingress/egress ID command and determines that the network node is an egress node in response to the network node having a direct connection to a destination identified by the ingress/egress ID command. The apparatus includes a telemetry packet circuit in the network node that is configured to create a telemetry packet in response to the node type identifier circuit determining that the network node is an ingress node. The telemetry packet includes a header with an indicator that the telemetry packet is for telemetry, a source internet protocol ("IP") address of the source and a destination IP address of the destination. The apparatus includes a telemetry transmission circuit in the network node that is configured to transmit the telemetry packet in response to the telemetry packet circuit creating the telemetry packet and a packet re-router circuit in the network node that is configured to, in response to the node type identifier circuit determining that the network node is an egress node, route a received telemetry packet to a network controller.

A program product comprising a computer readable storage medium that stores code executable by a processor, the executable code comprising code to, in response to receiving an ingress/egress ID command, determine that the network node is an ingress node in response to the network node comprising a direct connection to a source identified by the ingress/egress ID command and determine that the network node is an egress node in response to the network node comprising a direct connection to a destination identified by the ingress/egress ID command. The program product includes code to create a telemetry packet in response to determining that the network node is an ingress node, the telemetry packet comprising a header with an indicator that the telemetry packet is for telemetry, a source internet protocol ("IP") address of the source and a destination IP address of the destination. The program product includes code to transmit the telemetry packet in response to creating the telemetry packet and, in response to determining that the network node is an egress node, route a received telemetry packet to a network controller.

A network node is disclosed for in-band telemetry. The network node includes a node type identifier circuit that, in response to receiving an ingress/egress ID command, is configured to determine that the network node is an ingress node in response to the network node having a direct connection to a source, to determine that the network node is an egress node in response to the network node having a direct connection to a destination, and to determine that the network node is a transit node in response to the network node being in a data path between the source and the destination and not being directly connected to the source or to the destination. The network node includes a telemetry packet circuit that is configured to create a generated telemetry packet in response to the node type identifier circuit determining that the network node is an ingress node. The generated telemetry packet includes a header with an indicator that the generated telemetry packet is for telemetry, a source IP address of the source, a destination IP address of the destination.

The network node includes a latency information circuit that is configured to add latency information to a generated or received telemetry packet and a telemetry transmission circuit that is configured to transmit the generated or received telemetry packet to a next network node in response to the node type identifier circuit determining that the network node is an ingress node or a transit node. The network node includes a packet re-router circuit that, in response to the node type identifier circuit determining that the network node is an egress node, is configured to route the received telemetry packet to a network controller without transmitting the received telemetry packet to the destination.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as circuits, in order to more particularly emphasize their implementation independence. For example, a circuit may be implemented as hardware circuits comprising custom VLSI circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

Circuits may also be partially implemented in code and/or software module for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on a network controller, as a stand-alone software package, partly on the network controller and partly on the network node or entirely on the network node. In the latter scenario, the network node may be connected to the network controller through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by hardware circuits, software modules of code, and the like. This code may be provided to a processor of a computer or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a hardware circuit and/or a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus for in-band telemetry includes a node type identifier circuit in the network node that, in response to receiving an ingress/egress ID command, is configured to determine that the network node is an ingress node in response to the network node comprising a direct connection to a source and determines that the network node is an egress node in response to the network node comprising a direct connection to a destination. The apparatus includes a telemetry packet circuit in the network node that is configured to create a telemetry packet in response to the node type identifier circuit determining that the network node is an ingress node. The telemetry packet includes a header with an indicator that the telemetry packet is for telemetry, a source internet protocol ("IP") address of the source and a destination IP address of the destination. The apparatus includes a telemetry transmission circuit in the network node that is configured to transmit the telemetry packet in response to the telemetry packet circuit creating the telemetry packet and a packet re-router circuit in the network node that, in response to the node type identifier circuit determining that the network node is an egress node, routes a received telemetry packet to a network controller.

In some embodiments, the apparatus is configured to add latency information to the telemetry packet in response to the node type identifier circuit determining that the network node is the ingress node or the egress node. In other embodiments, the apparatus includes a transit node circuit in the network node that is configured, in response to receiving an ingress/egress ID command, to mark the network node as a transit node in response to determining that the network node is in a data path between the source and the destination and is not directly connected to the source or to the destination, add latency information to a received telemetry packet in response to the network node being a transit node, and transmit the telemetry packet to a next network node. In other embodiments, the source is a computing device configured for user access with a direct data connection to the ingress node and the destination is a computing device configured for user access with a direct connection to the egress node. In other embodiments, the source and/or the destination are servers connected to one or more clients.

In some embodiments, the telemetry packet circuit is configured to create the telemetry packet by receiving a packet and copying the packet. In other embodiments, the packet re-router circuit is configured to not forward the telemetry packet to the destination. In other embodiments, the network controller is configured to transmit the ingress/egress ID command to each network node in a network. In other embodiments, the ingress/egress ID command includes the source IP address, the destination IP address, a level 4 protocol type, a source port number and a destination port number. In other embodiments, the apparatus includes an identification transmission circuit that is configured to transmit a notification to the network controller with information identifying a network node type in response to the node type identifier circuit determining that the network node is the ingress node or the egress node.

A program product comprising a computer readable storage medium that stores code executable by a processor, the executable code comprising code to, in response to receiving an ingress/egress ID command, determine that the network node is an ingress node in response to the network node comprising a direct connection to a source identified by the ingress/egress ID command and determine that the network node is an egress node in response to the network node comprising a direct connection to a destination identified by the ingress/egress ID command. The program product includes code to create a telemetry packet in response to determining that the network node is an ingress node, the telemetry packet comprising a header with an indicator that the telemetry packet is for telemetry, a source internet protocol ("IP") address of the source and a destination IP address of the destination. The program product includes code to transmit the telemetry packet in response to creating the telemetry packet and, in response to determining that the network node is an egress node, route a received telemetry packet to a network controller.

In some embodiments, the computer program product includes code to add latency information to the telemetry packet in response to determining that the network node is the ingress node or the egress node. In other embodiments, the computer program product includes code, in response to receiving an ingress/egress ID command, to determine that the network node is a transit node in response to determining that the network node is in a data path between the source and the destination and is not directly connected to the source or to the destination, to add latency information to a received telemetry packet in response to the network node being a transit node, and to transmit the telemetry packet to a next network node. In other embodiments, the source is a computing device configured for user access with a direct data connection to the ingress node and the destination is a computing device configured for user access with a direct connection to the egress node. In other embodiments, the code configured to create a telemetry packet includes code to create the telemetry packet by receiving a packet and copying the packet. In other embodiments, the network controller is configured to transmit the ingress/egress ID command to each network node in a network and the ingress/egress ID command includes the source IP address, the destination IP address, a level 4 protocol type, a source port number and a destination port number.

A network node is disclosed for in-band telemetry. The network node includes a node type identifier circuit that, in response to receiving an ingress/egress ID command, is configured to determine that the network node is an ingress node in response to the network node having a direct connection to a source, determine that the network node is an egress node in response to the network node having a direct connection to a destination and determine that the network node is a transit node in response to the network node being in a data path between the source and the destination and not being directly connected to the source or to the destination. The network node includes a telemetry packet circuit that is configured to create a generated telemetry packet in response to the node type identifier circuit determining that the network node is an ingress node. The generated telemetry packet includes a header with an indicator that the generated telemetry packet is for telemetry, a source IP address of the source, a destination IP address of the destination.

The network node includes a latency information circuit that is configured to add latency information to a generated or received telemetry packet and a telemetry transmission circuit that is configured to transmit the generated or received telemetry packet to a next network node in response to the node type identifier circuit determining that the network node is an ingress node or a transit node. The network node includes a packet re-router circuit that, in response to the node type identifier circuit determining that the network node is an egress node, is configured to route the received telemetry packet to a network controller without transmitting the received telemetry packet to the destination.

In some embodiments, the telemetry packet circuit is configured to create the telemetry packet by receiving a packet and copying the packet. In other embodiments, the ingress/egress ID command comprises the source IP address, the destination IP address, a level 4 protocol type, a source port number and a destination port number.

Figure 1:
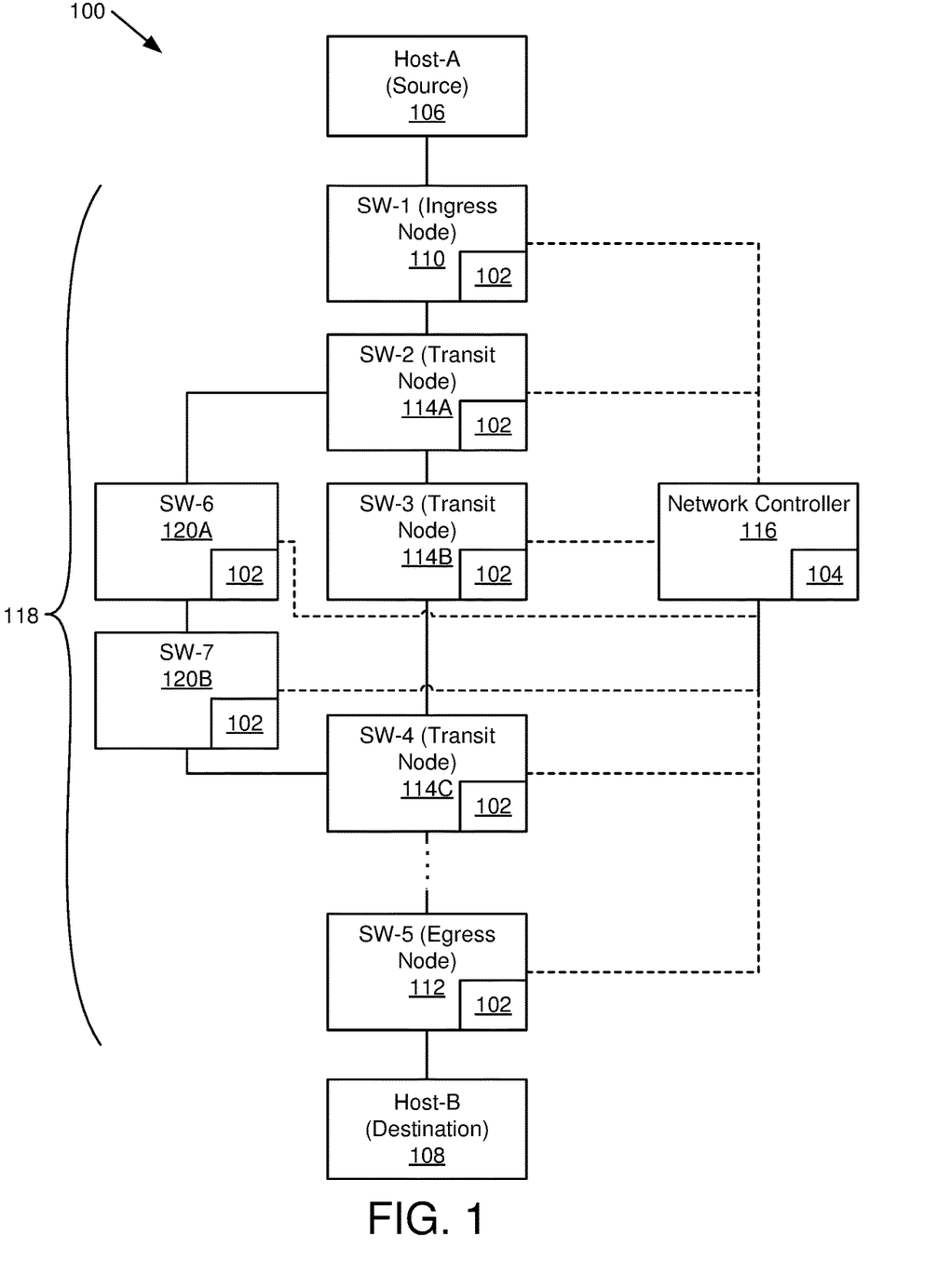
FIG. 1 is a schematic block diagram illustrating one embodiment of a data network with network nodes connecting a source and a destination where the network nodes are connected to a network controller and the network nodes each include a telemetry apparatus.

FIG. 1 is a schematic block diagram illustrating one embodiment of a data network 100 with network nodes 118, which include a first switch (SW-1) which is an ingress node 110, a fifth switch (SW-5) which is an egress node 112, switches SW-2, SW-3, and SW-4 which are transit nodes 114A-C (generically or collectively "114"), and switches SW-6 120A and SW-7 120B (generically or collectively "120") connecting a source 106 and a destination 108 where the network nodes 118 are connected to a network controller 116 and the network nodes 118 each include a telemetry apparatus 102. The network controller 116 includes a telemetry analysis apparatus 104. The data network 100 is described in detail below.

The data network 100 includes a source 106 and a destination 108, which are computing devices connected to network nodes 118 of the data network 100. The computing devices may be a host, a server, a workstation, a portable electronic device, etc. For example, the data network 100 may be in a data center, may be part of a computer network of a company, or other data network where a network controller communicates with each network node 118. In the embodiments described herein, in-band refers to data flows, telemetry information, etc. that are controlled by the network controller 116 rather than external networks administered by various parties. For example, Host-A (source) 106 and/or Host-B (destination) 108 may be part of multi-tenant servers with virtual machines each accessed by a client. In some embodiments, the source 106 and the destination 108 are computing devices configured for user access with a direct data connection to the ingress node 110 or egress node 112. In some embodiments, the data network 100 includes a connection to one or more external networks, such as the Internet, a wide-area-network, a cellular network, and the like.

The network nodes 118, are data transmission devices that facilitate receiving and sending data packets from the source 106 to the destination 108. A network node 118 may be a switch, a router or other transport device. In some embodiments, the network nodes 118 are layer-4 devices where layer-4 is the fourth layer in the Open Systems Interconnection ("OSI") Model. In other embodiments, the switches SW-1 to SW-7 are routers or other layer-4 devices. While seven switches SW-1 to SW-7 are depicted in FIG. 1, the data network 100 may include more switches or less switches. The network nodes 118 typically include a discovery mechanism that discovers connected network nodes 118 and other devices, such as the source 106 and destination 108 where information about the connected devices 106, 108, 118 are stored in a table. The table is some type of data structure, such as a register, a database, etc. Typically, the table includes whether or not a particular device, such as the source 106 or destination 108 are directly connected to a network node 118.

In some embodiments, a telemetry routing process used by the apparatuses 200, 300, 400 described below registers with the network nodes 118. As the data network 100 changes, data paths change which may affect routing from a source 106 to a destination 108, which affects telemetry routing.

The network nodes 118 are connected to a network controller 116. In some embodiments, the network nodes 118 are connected to the network controller 116 over a back channel which is not part of data flow between the source 106 and the destination 108. In one embodiment, the network controller 116 communicates with the network nodes 118 over network connections that carry data. In other embodiments, the network controller 116 communicates with the network nodes 118 over a side-band or out-of-band connection that is not part of data flow. For example, the network controller 116 may communicate with the network nodes 118 over a System Management Bus ("SMBUS"), I²C Bus, or the like. In some embodiments, the network controller 116 is connected directly to each network node 118. In other embodiments, the network controller 116 is connected indirectly to at least some network nodes 118. One of skill in the art will recognize other ways to connect the network controller 116 to the network nodes 118 and other ways to for the network controller 116 to manage the network nodes 118.

Network connections between the source 106 and ingress node 110, the destination 108 and egress node 112 and between network nodes 118 may be wired, wireless, fiber connections, and the like. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

As depicted in FIG. 1, each network node 118 includes a telemetry apparatus 102. The telemetry apparatus 102 is described in more detail with regards to FIGS. 2 and 3. The network controller 116 includes a telemetry analysis apparatus 104, which is described with regard to FIG. 4.

The data network 100 depicts only two hosts and a few network nodes 118, however, the data networks 100 is representative of other data networks with more hosts and other devices connected to network nodes as well as data networks with more network nodes in other configurations.

The network nodes 118 are depicted with multiple data paths from the source 106 to the destination 108. Additional parallel data paths may also exist from the source 106 to the destination 108. Often, a preferred data path exists from a source 106 to a destination 108, but other data paths may be used, for example, if the preferred pathway is unavailable, is slow, etc.

Figure 2:
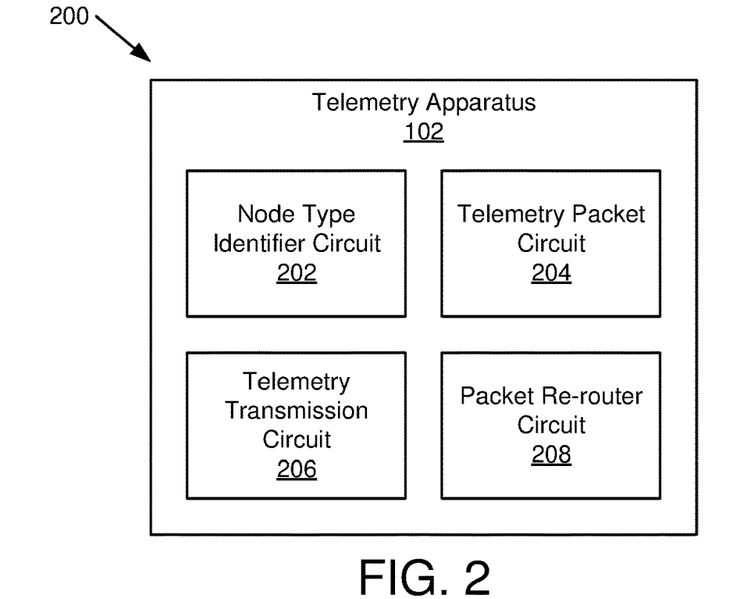
FIG. 2 is a schematic block diagram illustrating one embodiment of a telemetry apparatus.

FIG. 2 is a schematic block diagram 200 illustrating one embodiment of a telemetry apparatus 102. The telemetry apparatus 102 includes a node type identifier circuit 202, a telemetry packet circuit 204, a telemetry transmission circuit 206 and a packet re-router circuit 208, which are described below.

In the diagram 200, the telemetry apparatus 102, which is in a network node 118, includes a node type identifier circuit 202 that, in response to receiving an ingress/egress ID command, is configured to determine that the network node 118 is an ingress node 110 in response to the network node 118 having a direct connection to the source 106 identified in the ingress/egress ID command. The telemetry apparatus 102 also, in response to receiving an ingress/egress ID command, is configured to determine that the network node 118 is an egress node 108 in response to the network node 118 having a direct connection to the destination 108 identified in the ingress/egress ID command. Other possibilities for the network nodes 118, such as transit nodes 114 are discussed with regard to the diagram 300 of FIG. 3.

As defined herein, an ingress node 110 having a direct connection to the source 106 means that the ingress node 110 communicates with the source 106 without any other network nodes 118 between the ingress node 110 and the source 106. Likewise, as defined herein, an egress node 112 having a direct connection to the destination 108 means that the egress node 112 communicates with the destination 108 without any other network nodes 118 between the egress node 112 and the destination 108. Other components may exist between the ingress node 110 and the source 106, such as a repeater or other equipment that boosts or propagates signals between the ingress node 110 and the source 106 without further processing. Likewise, other components may exist between the egress node 112 and the destination 108, such as a repeater or other equipment that boosts or propagates signals between the egress node 112 and the destination 108 without further processing.

In some embodiments, the ingress node 110 and the egress node 112 each transmit a notification to the network controller 116 where the notification from the ingress node 110 includes information identifying the ingress node 110 and the notification from the egress node 112 includes information identifying the egress node 112. The notifications are useful to automatically inform the network controller 116 and/or a user which network node 118 is the ingress node 110 and which network node 118 is the egress node 112 where the network controller 116/user send the ingress/egress ID command to obtain the ingress/egress ID information. In some embodiments, the ingress/egress ID command is one command that returns the ingress/egress ID information and starts an in-band telemetry operation where a telemetry packet is generated and sent. In other embodiments, the ingress/egress ID command is in two parts where a first part returns the ingress/egress ID information and a second part directs the ingress node 110 to create and transmit a telemetry packet. The node type identifier circuit 202 intercepts an ingress/egress ID command sent from the network controller 116. A network node 118 typically communicates with the network controller 116 and the telemetry apparatus 102 is in addition to existing hardware that is part of the network node 118.

The telemetry packet circuit 204 is configured to create a telemetry packet in response to the node type identifier circuit 202 determining that the network node 118 is an ingress node 110. In some embodiments, the telemetry packet circuit 204 is configured to create a telemetry packet by receiving a packet, for example from the source 106, and copying the packet. The copied packet, in some embodiments, is a packet from the source 106 to the destination 108. The telemetry packet circuit 204 then is configured to modify the copied packet to be a telemetry packet. The telemetry packet includes at least a header with an indicator that the telemetry packet is for telemetry, a source internet protocol ("IP") address of the source and a destination IP address of the destination. For example, the indicator that the telemetry packet is for telemetry may include a format for in-band telemetry. In other embodiments, the indicator that the telemetry packet is for telemetry includes one or more commands. One of skill in the art will recognize how to create a header that signals a network node 118 that the telemetry packet is for telemetry.

In other embodiments, the telemetry packet includes other information, such as an indicator that the telemetry packet is a telemetry packet, a level 4 protocol type, such as User Datagram Protocol ("UDP"), Transmission Control Protocol ("TCP"), etc., data fields for telemetry information, and the like. The telemetry packet includes information sufficient for each network node 118 receiving the telemetry packet to know that the telemetry packet is intended to follow a data path between the source 106 and the destination 108 where the telemetry packet originates at the ingress node 110 and exits at the egress node 112 and to add latency information to the telemetry packet. One of skill in the art in the field of in-band telemetry will recognize other features of a telemetry packet.

The telemetry transmission circuit 206 is configured to transmit the telemetry packet in response to the telemetry packet circuit 204 creating the telemetry packet. The telemetry transmission circuit 206 is configured to send the telemetry packet to a next network node 118 in a data path from the source 106 to the destination 108. Typically, header information in the telemetry packet includes the source IP address and the destination IP address and other pertinent information for each network node 118 to receive and then retransmit the telemetry packet along the data pathway from the source 106 to the destination 108.

The packet re-router circuit 208, in response to the node type identifier circuit 202 determining that the network node 118 is the egress node 112, is configured to route a received telemetry packet to the network controller 116. Typically, the packet re-router circuit 208 does not send the telemetry packet to the destination 108.

Figure 3:
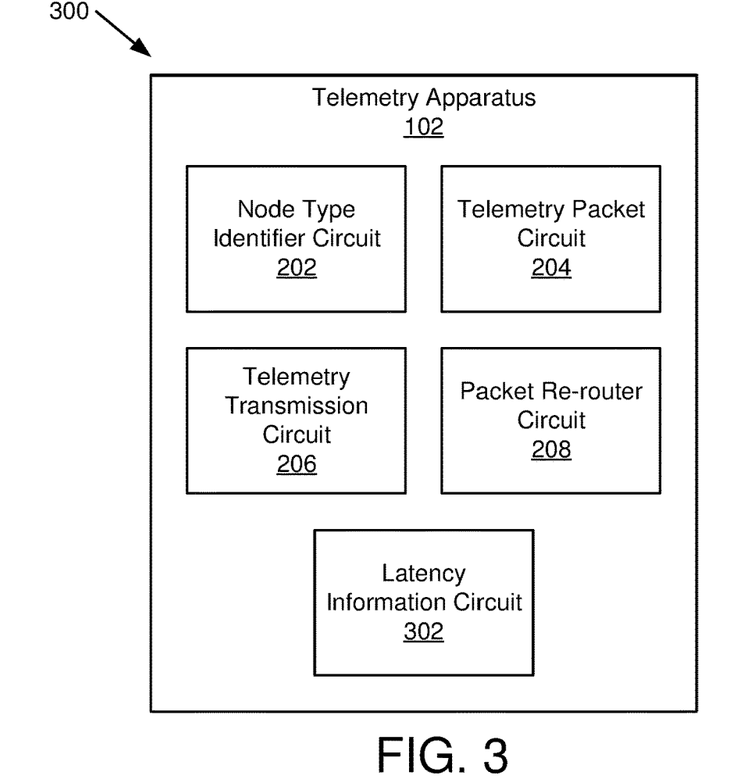
FIG. 3 is a schematic block diagram illustrating another embodiment of a telemetry apparatus.

FIG. 3 is a schematic block diagram 300 illustrating another embodiment of a telemetry apparatus 102. In the depicted embodiment, the telemetry apparatus 102 includes a node type identifier circuit 202, a telemetry packet circuit 204, a telemetry transmission circuit 206 and a packet re-router circuit 208, which are substantially similar to those described above in relation with the embodiment of the telemetry apparatus 102 of FIG. 2. In some embodiments, the telemetry apparatus 102 includes a transit node circuit 302 and a latency information circuit 302, which are described below.

The embodiment of the telemetry apparatus 102, the node type identifier circuit 202, in response to receiving an ingress/egress ID command, is configured to determine that the network node is a transit node in response to the network node being in a data path between the source and the destination and not being directly connected to the source or to the destination. In some embodiments, the node type identifier circuit 202 may also add latency information to a received telemetry packet in response to the network node 118 being a transit node 114. The telemetry transmission circuit 206 is configured to transmit the received telemetry packet to a next network node 118.

For example, the node type identifier circuit 202 may determine that the network node 118 is not an ingress node 110 or an egress node 112 and the node type identifier circuit 202 may then determine that the network node 118 is in the data path between the source 106 and the destination 108 and configures the network node 118 as a transit node 114. In one embodiment, when the transit node 114 receives a telemetry packet from another network node 118, the transit node 114 adds latency information regarding the transit node 114 to the telemetry packet and then the packet re-router circuit 208 transmits the telemetry packet to a next network node 118 in the data path between the source 106 and the destination 108.

In other embodiments, the network node 118 (e.g. SW-6 120A and SW-7 120B) may not be in the data path from the source 106 to the destination 108. Upon receipt of the ingress/egress ID command, the network node 118, in some embodiments, retains information from the ingress/egress ID command in case the network node 118 becomes part of the data path between the source 106 and the destination 108, in which case the node type identifier circuit 202 then configures the network node 118 as a transit node 114. In some embodiments, the network nodes 118 maintain information from an ingress/egress ID command for a period of time and then expire. In other embodiments, the network nodes 118 maintain information from an ingress/egress ID command until another ingress/egress ID command is received. One of skill in the art will recognize other appropriate ways to receive and maintain information from an ingress/egress ID command.

The embodiment of the telemetry apparatus 102 depicted in FIG. 3 includes a latency information circuit 302 that adds latency information to a generated or received telemetry packet. The latency information includes processing time, delay time, etc. In some embodiments, the latency information is in units of time. For example, latency information may be 1 microseconds ("µS"). Once the network controller 116 receives the telemetry packet, the network controller 116 may analyze telemetry data in the telemetry packet and may analyze and/or display the telemetry data in the telemetry packet. The latency information circuit 302, in some embodiments, is included where a network node 118 does not already include an ability to add latency information to a telemetry packet. For example, the latency information circuit 302 may work in conjunction with the telemetry packet circuit 202, the telemetry transmission circuit 206, and/or the packet re-router circuit 208 to add latency information to a telemetry packet before the telemetry packet is transmitted.

The latency information, in other embodiments, includes other data. In some examples, the latency information includes queue occupation for the network node 118. The queue occupation may include a percentage of how much of a queue is occupied. In other examples, the latency information includes a congestion status of the network node 118. For example, the congestion status may include "congested" or "not congested." In other examples, the latency information includes port identification of a network node 118, which provides additional information regarding a data pathway from the source 106 to the egress 108. The latency information may include some or all of the information listed above.

As an example, a data flow A→B from the Host-A 106 to the Host-B 108 including latency information may be: Host-A 106→SW-1 (1 µS)→SW-2 (1 µS)→SW-3 (1000 µS)→SW-4 (2 µS)→SW-5 (1 µS)→Host-B 108. As can be seen, SW-3 has a relatively long latency time of 1000 µS, which may prompt the network controller 116 and/or network administrator to change the data path from the source (Host-A) 106 to the destination (Host-B) 108 to include SW-6 120A and SW-7 120B, which may have a lower latency than SW-3. A reverse data flow B→A from Host-B 108 to Host-A 106 may be: Host-B→SW-5 (1 µS)→SW-4 (1 µS)→SW-3 (3 µS)→SW-2 (1 µS)→SW-1 (1 µS)→Host-A 106. The reverse data flow B→A reveals that SW-3 continues to be slower than other switches, but may or may not justify the network controller 116 changing the data path from Host-B 108 to Host-A 106.

The node type identifier circuit 202, telemetry packet circuit 204, telemetry transmission circuit 206, packet re-router circuit 208 and the latency information circuit 302 in the telemetry apparatus 102 on a network node 118, in some embodiments, include hardware circuits. In other embodiments, at least a portion of the circuits 202, 204, 206, 208, 302 includes a programmable hardware device, such as an FPGA. In other embodiments, the circuits 202, 204, 206, 208, 302 at least a portion is implemented on a processor executing code stored on computer readable storage media.

Figure 4:
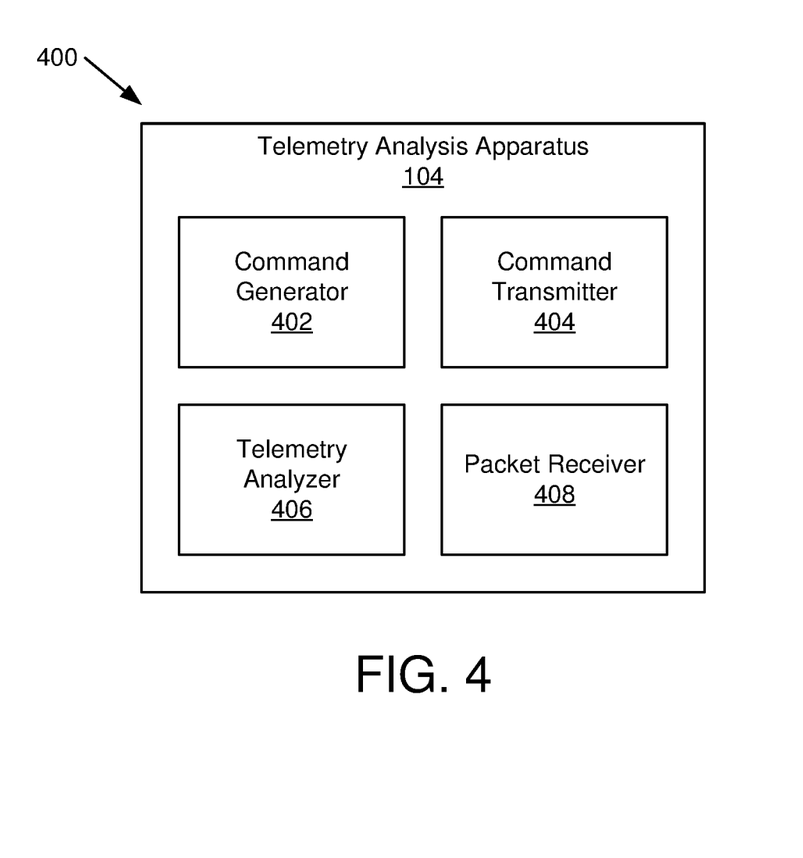
FIG. 4 is a schematic block diagram illustrating one embodiment of a telemetry analysis apparatus.

FIG. 4 is a schematic block diagram 400 illustrating one embodiment of a telemetry analysis apparatus 104. The telemetry analysis apparatus 104 includes a command generator 402, a command transmitter 404, a telemetry analyzer 406 and a packet receiver 408, which are described below. The telemetry analysis apparatus 104 compliments the telemetry apparatus 102 located in the network nodes 118.

The telemetry analysis apparatus 104, in some embodiments, includes hardware circuits. In other embodiments, the telemetry analysis apparatus 104 is implemented with a programmable hardware device, such as an FPGA, an ASIC, etc. In other embodiments, the telemetry analysis apparatus 104 is implemented in executable code stored on computer readable storage media which executes on a process of the network controller 116. Other embodiments include a combination of hardware circuits, a programmable hardware device and executable code. For example, the command transmitter 404 and packet receiver 408 may include hardware to enable sending an ingress/egress ID command and to receive a telemetry packet while other elements of the telemetry analysis apparatus 104 are implemented in executable code and/or a programmable hardware device. In other embodiments, the telemetry analysis apparatus 104 does not include hardware circuits and relies on hardware in the network controller 116 for certain functions. One of skill in the art will recognize other ways to implement the telemetry analysis apparatus 104.

The telemetry analysis apparatus 104 includes a command generator 402 that is configured to create an ingress/egress ID command that initiates telemetry tracking in a data network 100 between a source 106 and a destination 108. The source 106 and the destination 108 are connected through network nodes 118 in the data network 100 and the ingress/egress ID command includes a source IP address of the source 106 and a destination IP address of the destination 109. In other embodiments, the ingress/egress ID command includes other information, such as a level 4 protocol type, a source port number, a destination port number, and the like. For example, a user may initiate a telemetry operation between the source 106 and the destination 108 and the command generator 402 is configured to create the ingress/egress ID command in response to the user's input. In other embodiments, the command generator 402 is configured to initiate creation of the ingress/egress ID command, for example in response to slow transmission from the source 106 to the destination 108 above a threshold. One of skill in the art will recognize other ways for the command generator 402 to create an ingress/egress ID command.

The telemetry analysis apparatus 104 includes a command transmitter 404 that is configured to transmit the ingress/egress ID command to network nodes 118 in the data network 100. In one example, the command transmitter 404 is configured to transmit the ingress/egress ID command in response to the command generator 402 generating the ingress/egress ID command. In other embodiments, the command transmitter 404 is configured to transmit the ingress/egress ID command in response to user input.

In some embodiments, the command transmitter 404 is configured to transmit the ingress/egress ID command over a side-band or out-of-band connection that is not part of the data flow from the source 106 to the destination 108. For example, the command transmitter 404 may communicate with the network nodes 118 over a System Management Bus ("SMBUS"), I²C Bus, or the like. In some embodiments, the network controller 116 is a baseboard management controller ("BMC"). In other embodiments, the network controller 116 is a computer with network control functions. In other embodiments, the command transmitter 404 is configured to transmit the ingress/egress ID command over data channels that include typical data transmission, which may include data channels that are part of the data path from the source 106 to the destination 108.

The telemetry analysis apparatus 104 includes a telemetry analyzer 406 that is configured to receive a telemetry packet from an egress node 112 and analyzes latency information in the telemetry packet. For example, after the command transmitter 404 is configured to transmit the ingress/egress ID command to the network nodes 118 in the data network 100, the ingress node 110 creates and transmits a telemetry packet and the ingress node 110, transit nodes 114 and the egress node 112 and the latency information circuit 302 adds latency information to the telemetry packet and the packet re-router circuit 208 in the egress node 112 transmits the telemetry packet with telemetry data to the telemetry analyzer 406.

In some embodiments, the telemetry analyzer 406 analyzing latency information in the telemetry packet includes displaying the latency information. In some examples, the telemetry analyzer 406 is configured to display the latency information along with corresponding network nodes 118. In other embodiments, the telemetry analyzer 406 analyzing latency information in the telemetry packet includes determining which network nodes 118 are causing delays. For example, the telemetry analyzer 406 may compare latency information from the source 106 to the destination 108 to previous latency information. In other embodiments, the telemetry analyzer 406 is configured to compare latency information of a network node 118 to expected latency information. In other embodiments, the telemetry analyzer 406 is configured to display comparison information along with current latency information. One of skill in the art will recognize other ways for the telemetry analyzer 406 to analyze latency information from a telemetry packet by analyzing and/or displaying the latency information.

Figure 5:
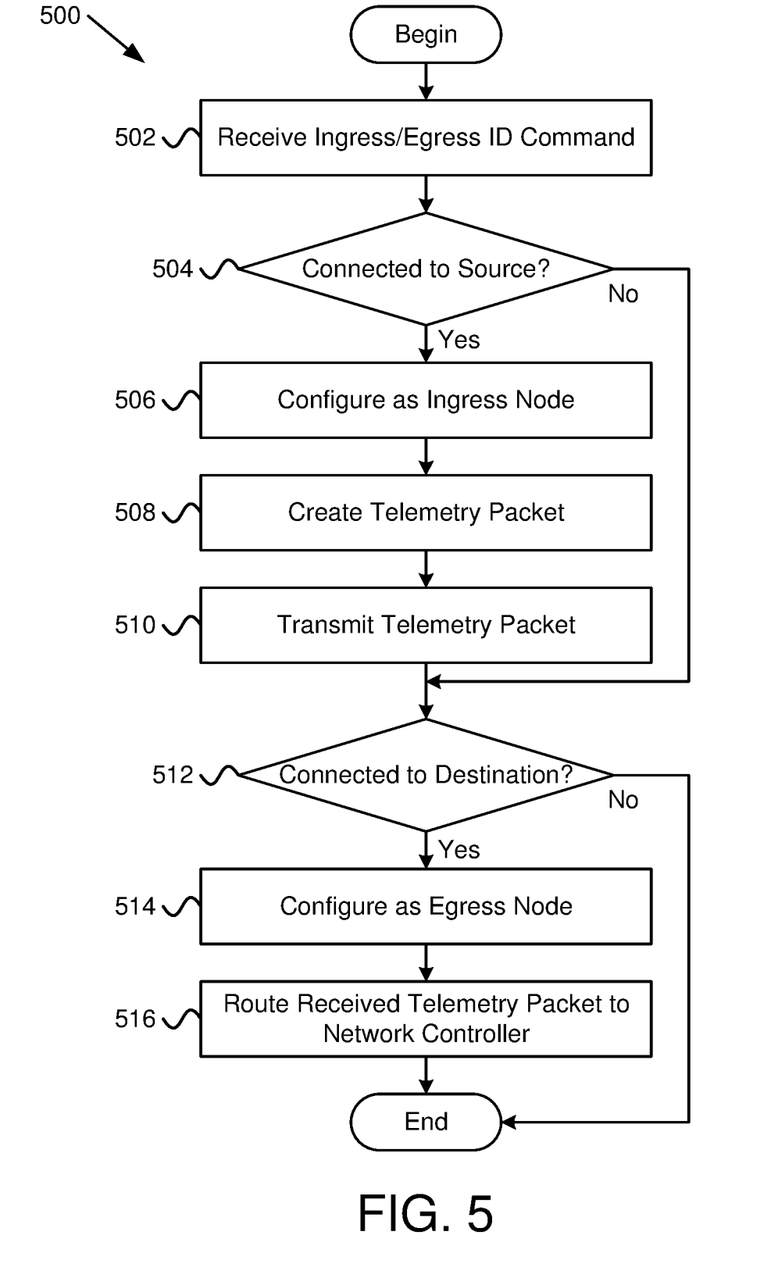
FIG. 5 is a schematic flow chart diagram illustrating one embodiment of a method for configuring in-band telemetry with network nodes and transmitting a telemetry packet.

FIG. 5 is a schematic flow chart diagram illustrating one embodiment of a method 500 for configuring in-band telemetry with network nodes 118 and transmitting a telemetry packet. The method 500 begins and receives 502, at a network node 118, an ingress/egress ID command. The method 500 determines 504 if the network node 118 is connected directly to the source 106. If the method 500 determines 504 that the network node 118 is connected directly to the source 106 identified by the ingress/egress ID command, the method 500 configures 506 the network node 118 as an ingress node 110 and creates 508 a telemetry packet that includes at least a source IP address of the source 106 and a destination IP address of the destination 108. The method 500 may also add other information to the telemetry packet, such as a level 4 protocol type, a source port number and/or a destination port number. Where the method 500 determines 504 that the network node 118 is connected directly to the source 106, the method 500 also transmits 510 the telemetry packet to a next network node 118 in a data path from the source 106 to the destination 108. If the method 500 determines 504 that the network node 118 is not connected directly to the source 106, the method 500 bypasses steps 506-510.

The method 500 determines 512 if a network node 118 that receives 502 the ingress/egress ID command is connected directly to the destination 108. If the method 500 determines 512 that the network node 118 is connected directly to the destination 108, the method 500 configures 514 the network node 118 as an egress node 112 and routes 516 a received telemetry packet to the network controller 116, and the method 500 ends. If the method 500 determines that the network node 118 is not connected directly to the destination 108, the method 500 bypasses steps 514 and 516 and the method 500 ends. In various embodiments, the method 500 is implemented at least partially with the node type identifier circuit 202, the telemetry packet circuit 204, the telemetry transmission circuit 206 and/or the packet re-router circuit 208.

Figure 6:
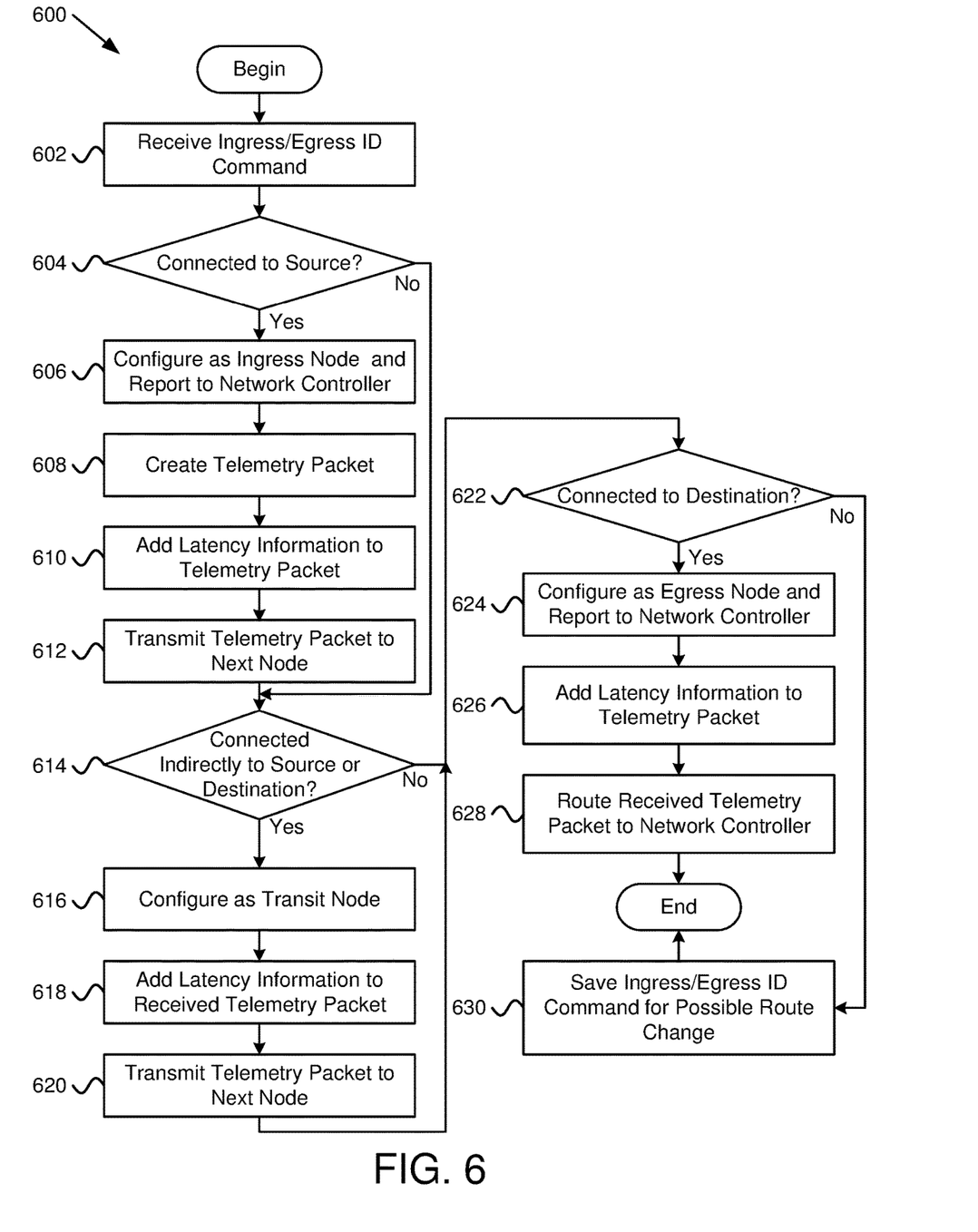
FIG. 6 is a schematic flow chart diagram illustrating another embodiment of a method for configuring in-band telemetry with network nodes and transmitting a telemetry packet.

FIG. 6 is a schematic flow chart diagram illustrating another embodiment of a method 600 for configuring in-band telemetry with network nodes 118 and transmitting a telemetry packet. The method 600 begins and receives 602, at a network node 118, an ingress/egress ID command. The method 600 determines 604 if the network node 118 is connected directly to the source 106 identified by the ingress/egress ID command. If the method 600 determines 604 that the network node 118 is connected directly to the source 106, the method 600 configures 606 the network node 118 as an ingress node 110 and reports the ingress node 110 to the network controller 116 and creates 608 a telemetry packet that includes at least a source IP address of the source 106 and a destination IP address of the destination 108 identified by the ingress/egress ID command. The method 600 may also add other information to the telemetry packet, such as a level 4 protocol type, a source port number and/or a destination port number. Where the method 600 determines 604 that the network node 118 is connected directly to the source 106, the method 600 also adds 610 latency information to the telemetry packet and transmits 612 the telemetry packet to a next network node 118 in a data path from the source 106 to the destination 108. If the method 600 determines 604 that the network node 118 is not connected directly to the source 106, the method 600 bypasses steps 606-612.

The method 600 determines 614 if the network node 118 is indirectly connected to the source 106 or destination 108 identified by the ingress/egress ID command as part of a data path between the source 106 and the destination 108. If the method 600 determines 614 that the network node 118 is indirectly connected to the source 106 or destination 108, the method 600 configures 616 the network node 118 as a transit node 114 and optionally reports the transit node 114 to the network controller 116, adds 618 latency information to a received telemetry packet and transmits 620 the received telemetry packet to a next network node 118 in the data path. If the method 600 determines 614 that the network node 118 is not indirectly connected to the source 106 or destination 108, the method 600 bypasses steps 616-620.

The method 600 determines 622 if a network node 118 that receives 602 the ingress/egress ID command is connected directly to the destination 108 identified by the ingress/egress ID command. If the method 600 determines 622 that the network node 118 is connected directly to the destination 108, the method 600 configures 624 the network node 118 as an egress node 112 and reports the egress node 112 to the network controller 116, adds 626 latency information to the telemetry packet and routes 628 a received telemetry packet to the network controller 116. The method 600 reports and the method 600 ends. If the method 600 determines that the network node 118 is not connected directly to the destination 108, the method 600 bypasses steps 624-628 and saves 630 information from the ingress/egress ID command for a possible data path change, and the method 600 ends.

Note that the methods 500 and 600 depicts a particular flow of steps but may be practiced in another order. For example, each network node 118 in the data network 100 may receive the ingress/egress command and may determine 504, 512, 604, 614, 622 if the network node 118 is an ingress node 110, an egress node 112 or a transit node 114 and may configure 506, 606 the ingress node 110, configure 512, 622 the egress node 112, and configure 614 the transit nodes 114 prior to any creation or transmission of a telemetry packet. In various embodiments, the method 600 is implemented at least partially with the node type identifier circuit 202, the telemetry packet circuit 204, the telemetry transmission circuit 206, the packet re-router circuit 208 and/or the latency information circuit 302.

Figure 7:
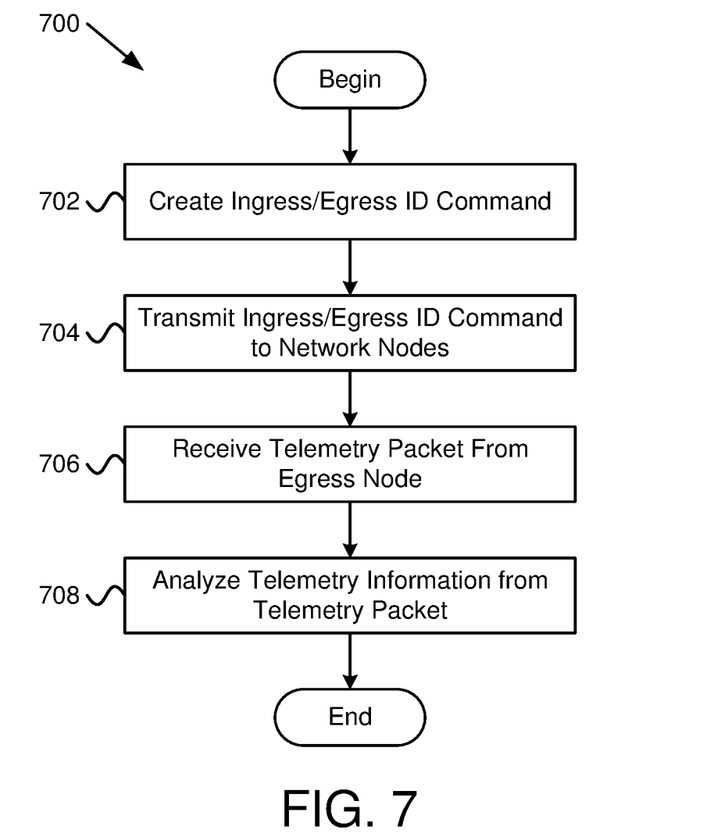
FIG. 7 is a schematic flow chart diagram illustrating one embodiment of a method for configuring in-band telemetry from a network controller and receiving a telemetry packet.

FIG. 7 is a schematic flow chart diagram illustrating one embodiment of a method 700 for configuring in-band telemetry from a network controller 116 and receiving a telemetry packet. The method 700 begins and creates 702 an ingress/ egress ID command that initiates telemetry tracking in a data network 100 between a source 106 and a destination 108. The source 106 and the destination 108 are connected through network nodes 118 in the data network 100 and the ingress/egress ID command includes a source IP address of the source 106 and a destination IP address of the destination 108. The method 700 transmits 704 the ingress/egress ID command to network nodes 118 in the data network 100. The method 700 receives 706 a telemetry packet from an egress node 112 and analyzes 708 latency information in the telemetry packet, and the method 700 ends. In various embodiments, the method 700 is implemented at least partially with the command generator 402, the command transmitter 404 and/or the telemetry analyzer 406.

Figure 8:
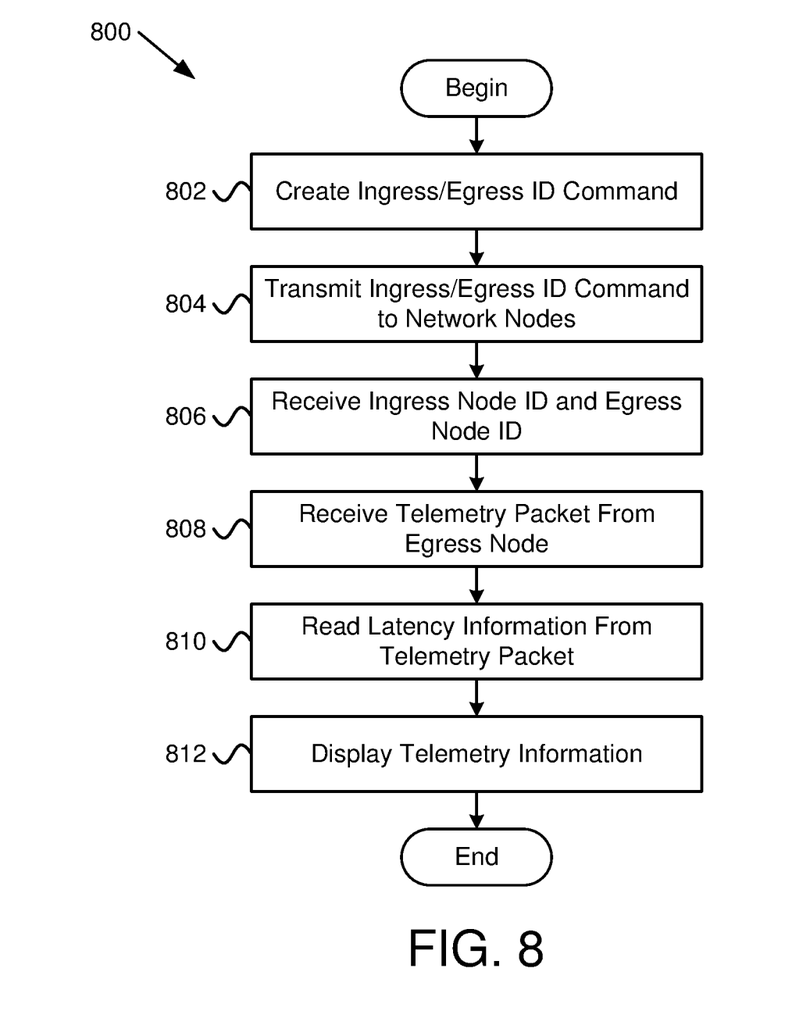
FIG. 8 is a schematic flow chart diagram illustrating one embodiment of another method for configuring in-band telemetry from a network controller, receiving a telemetry packet and displaying telemetry data.

FIG. 8 is a schematic flow chart diagram illustrating one embodiment of another method 800 for configuring in-band telemetry from a network controller 116, receiving a telemetry packet and displaying telemetry data. The method 800 begins and creates 802 an ingress/egress ID command that initiates telemetry tracking in a data network 100 between a source 106 and a destination 108. The source 106 and the destination 108 are connected through network nodes 118 in the data network 100 and the ingress/egress ID command includes a source IP address of the source 106 and a destination IP address of the destination 108. The method 800 transmits 804 the ingress/egress ID command to network nodes 118 in the data network 100.

The method 800 receives 806 an ingress IP address of the ingress node 110 and an egress IP address for the egress node 112. The method 800 receives 808 a telemetry packet from an egress node 112, reads 810 telemetry information from the telemetry packet and displays 812 latency information in the telemetry packet, and the method 800 ends. In other embodiments, the method 600 also analyzes the telemetry information before displaying 812 the latency information and may reformat and/or add to the latency information based on the analysis. In various embodiments, the method 800 is implemented at least partially with the command generator 402, the command transmitter 404 and/or the telemetry analyzer 406.

Beneficially, the telemetry apparatus 102 and the telemetry analysis apparatus 104 provide an efficient way to initiate in-band telemetry by simply creating and sending an ingress/egress ID command. The telemetry analysis apparatus 104 may include a user interface that queries a user for a source 106 and a destination 108 and then creates and transmits the ingress/egress ID command. The telemetry apparatus 102 may then automatically identify the ingress node 110 and egress node 112 and transmit this information to the telemetry analysis apparatus 104. The telemetry apparatus 102 may also initiate creation and transmission of a telemetry packet automatically or by prompt of a user. Other prior art in-band telemetry operations require many more steps and work to initiate in-band telemetry.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for in-band telemetry comprising:
 a node type identifier circuit in a network node that, in response to receiving an ingress/egress ID command, is configured to:
  determine that the network node is an ingress node in response to the network node comprising a direct connection to a source identified by the ingress/egress ID command; and
  determine that the network node is an egress node in response to the network node comprising a direct connection to a destination identified by the ingress/egress ID command;
 a telemetry packet circuit in the network node that is configured to, in response to the node type identifier circuit determining that the network node is an ingress node, create a telemetry packet separate from data packets with information being transmitted from the source to the destination, the telemetry packet comprising a header with an indicator that the telemetry packet is for telemetry, a source internet protocol ("IP") address of the source and a destination IP address of the destination;
 a telemetry transmission circuit in the network node that is configured to transmit the telemetry packet in response to the telemetry packet circuit creating the telemetry packet; and
 a packet re-router circuit in the network node that is configured to, in response to the node type identifier circuit determining that the network node is an egress node and in response to determining that a received packet is a telemetry packet, route a received telemetry packet to a network controller without transmitting any data of the telemetry packet to the destination.

2. The apparatus of claim 1, wherein the apparatus is configured to add latency information to the telemetry packet in response to the node type identifier circuit determining that the network node is the ingress node or the egress node.

3. The apparatus of claim 1, further comprising a transit node circuit in the network node that is configured, in response to receiving an ingress/egress ID command, to:
 determine that the network node is a transit node in response to determining that the network node is in a data path between the source and the destination and is not directly connected to the source or to the destination;
 add latency information to a received telemetry packet in response to the network node being a transit node; and
 transmit the telemetry packet to a next network node.

4. The apparatus of claim 1, wherein the source is a computing device configured for user access with a direct data connection to the ingress node and the destination is a computing device configured for user access with a direct connection to the egress node.

5. The apparatus of claim 4, wherein the source and/or the destination are servers connected to one or more clients.

6. The apparatus of claim 1, wherein the telemetry packet circuit is configured to create the telemetry packet by receiving a packet and copying the packet and adding the indicator to a header of the copied data packet that the telemetry packet is for telemetry.

7. The apparatus of claim 1, wherein the network controller is configured to transmit the ingress/egress ID command to each network node in a network.

8. The apparatus of claim 1, wherein the ingress/egress ID command comprises the source IP address, the destination IP address, a level 4 protocol type, a source port number and a destination port number.

9. The apparatus of claim 1, further comprising an identification transmission circuit that is configured to transmit a notification to the network controller, the notification comprising information identifying a network node type in response to the node type identifier circuit determining that the network node is the ingress node or the egress node.

10. The apparatus of claim 1, wherein the telemetry packet circuit creates the telemetry packet by creating a new packet without data for transmission from the source to the destination.

11. A program product comprising a non-volatile computer readable storage medium that stores code executable by a processor, the executable code comprising code to:
in response to receiving an ingress/egress ID command:
determine that the network node is an ingress node in response to the network node comprising a direct connection to a source identified by the ingress/egress ID command; and
determine that the network node is an egress node in response to the network node comprising a direct connection to a destination identified by the ingress/egress ID command;
in response to determining that the network node is an ingress node, create a telemetry packet separate from data packets with information being transmitted from the source to the destination, the telemetry packet comprising a header with an indicator that the telemetry packet is for telemetry, a source internet protocol ("IP") address of the source and a destination IP address of the destination;
transmit the telemetry packet in response to creating the telemetry packet; and
in response to determining that the network node is an egress node and in response to determining that a received packet is a telemetry packet, route a received telemetry packet to a network controller without transmitting any data of the telemetry packet to the destination.

12. The computer program product of claim 11, further comprising code to add latency information to the telemetry packet in response to determining that the network node is the ingress node or the egress node.

13. The computer program product of claim 11, further comprising code, in response to receiving an ingress/egress ID command, to:
determine that the network node is a transit node in response to determining that the network node is in a data path between the source and the destination and is not directly connected to the source or to the destination;
add latency information to a received telemetry packet in response to the network node being a transit node; and
transmit the telemetry packet to a next network node.

14. The computer program product of claim 11, wherein the source is a computing device configured for user access with a direct data connection to the ingress node and the destination is a computing device configured for user access with a direct connection to the egress node.

15. The computer program product of claim 14, wherein the source and/or the destination are servers connected to one or more clients.

16. The computer program product of claim 11, wherein the code configured to create a telemetry packet further comprises code to create the telemetry packet by receiving a packet and copying the packet and adding the indicator to a header of the copied data packet that the telemetry packet is for telemetry.

17. The computer program product of claim 11, wherein the network controller is configured to transmit the ingress/egress ID command to each network node in a network and wherein the ingress/egress ID command comprises the source IP address, the destination IP address, a level 4 protocol type, a source port number and a destination port number.

18. A network node for in-band telemetry, the network node comprising:
a node type identifier circuit that, in response to receiving an ingress/egress ID command is configured to:
determine that the network node is an ingress node in response to the network node comprising a direct connection to a source;
determine that the network node is an egress node in response to the network node comprising a direct connection to a destination; and
determine that the network node is a transit node in response to the network node being in a data path between the source and the destination and not being directly connected to the source or to the destination;
a telemetry packet circuit that is configured to, in response to the node type identifier circuit determining that the network node is an ingress node, create a generated telemetry packet separate from data packets with information being transmitted from the source to the destination, the generated telemetry packet comprising a header with an indicator that the generated telemetry packet is for telemetry, a source internet protocol ("IP") address of the source, a destination IP address of the destination;
a latency information circuit that is configured to add latency information to a generated or received telemetry packet;
a telemetry transmission circuit that is configured to transmit the generated or received telemetry packet to a next network node in response to the node type identifier circuit determining that the network node is an ingress node or a transit node; and
a packet re-router circuit that, in response to the node type identifier circuit determining that the network node is an egress node and in response to determining that a received packet is a telemetry packet, is configured to route the received telemetry packet to a network controller without transmitting the received telemetry packet to the destination.

19. The network node of claim 18, wherein the telemetry packet circuit is configured to create the telemetry packet by receiving a packet and copying the packet and adding the indicator to a header of the copied data packet that the telemetry packet is for telemetry.

20. The network node of claim 18, wherein the ingress/egress ID command comprises the source IP address, the destination IP address, a level 4 protocol type, a source port number and a destination port number.

* * * * *